United States Patent [19]
Kumashiro

[11] Patent Number: 5,666,443
[45] Date of Patent: Sep. 9, 1997

[54] IMAGE PROCESSOR WITH EDGE EMPHASIS OF IMAGE DATA

[75] Inventor: Hideo Kumashiro, Toyokawa, Japan

[73] Assignee: Minolta Co., Ltd., Osaka, Japan

[21] Appl. No.: 291,113

[22] Filed: Aug. 16, 1994

[30] Foreign Application Priority Data

Aug. 24, 1993 [JP] Japan .................................. 5-209376

[51] Int. Cl.⁶ .............................. G06T 5/00; H04N 1/409
[52] U.S. Cl. ........................... 382/266; 382/275; 358/447; 358/463
[58] Field of Search .................... 358/447, 448, 358/455, 456, 458, 462, 463, 465, 466, 532, 530; 382/54, 50, 51, 52, 266, 275, 260, 261, 263, 264, 265, 304; 348/687

[56] References Cited

U.S. PATENT DOCUMENTS

| | | |
|---|---|---|
| 4,786,976 | 11/1988 | Takao et al. .......................... 358/456 |
| 5,060,284 | 10/1991 | Klees ................................... 358/465 |
| 5,166,810 | 11/1992 | Sorimachi et al. ..................... 358/462 |
| 5,231,677 | 7/1993 | Mita et al. ............................. 358/447 |
| 5,262,863 | 11/1993 | Okada ................................... 348/687 |
| 5,357,353 | 10/1994 | Hirota ................................... 358/530 |

FOREIGN PATENT DOCUMENTS 63-3563  1/1988  Japan .

*Primary Examiner*—Scott A. Rogers
*Attorney, Agent, or Firm*—Sidley & Austin

[57] ABSTRACT

Image data of an original image in a prescribed pixel matrix is subjected to edge emphasis. On the other hand, a maximum and a minimum of the image data are detected. Then, values of the image data subjected to edge emphasis are limited between the maximum and the minimum to provide output data. Thus, edge emphasis can be performed without increasing noises even for hand-written characters of low densities.

19 Claims, 12 Drawing Sheets

Fig.3

| 0  | 0 | -1 | 0 | 0  |
|----|---|----|---|----|
| 0  | 0 | 0  | 0 | 0  |
| -1 | 0 | 4  | 0 | -1 |
| 0  | 0 | 0  | 0 | 0  |
| 0  | 0 | -1 | 0 | 0  |

Fig.4

| 1 | 2 | 4  | 2 | 1 |
|---|---|----|---|---|
| 2 | 4 | 8  | 4 | 2 |
| 4 | 8 | 16 | 8 | 4 |
| 2 | 4 | 8  | 4 | 2 |
| 1 | 2 | 4  | 2 | 1 |

IMAGE PROCESSOR WITH EDGE EMPHASIS OF IMAGE DATA

BACKGROUND OF THE INVENTION

1. Field of the Invention

The present invention relates to an image processor for performing edge emphasis of an original image.

2. Description of the Prior Art

In an image processor, edge emphasis is performed with a digital filter in order to guarantee a resolution. The digital filter used is a secondary differential filter (Laplacian filter).

However, when the above-mentioned edge emphasis is performed, noise components at high frequencies are also emphasized, and this deteriorates image quality. On the other hand, if the above-mentioned edge emphasis is performed weakly in order to suppress emphasis of noise components, narrow lines and the like cannot be emphasized well. In order to solve this problem, edge emphasis is proposed which does not include adjacent pixels around a target pixel if the density of the target pixel is different from those of adjacent ones around the target one within a certain value. However, this approach has a problem that edge emphasis cannot be performed for a character region including hand-written characters of low densities wherein the densities thereof are not sufficiently large.

SUMMARY OF THE INVENTION

An object of the present invention is to provide an image processor which can perform edge emphasis more appropriately.

In one aspect of the present invention, edge emphasis is performed on the image data say in a prescribed pixel matrix. Then, image data are suppressed so that they do not have levels which have not been in the image data in the prescribed pixel matrix before the edge emphasis by the edge emphasis circuit. Preferably, image data suppression is processed for image data in a prescribed pixel block.

In a different aspect of an image processor of the invention, a maximum and/or minimum of image data in a prescribed pixel matrix are detected. Then, image data levels are limited so that image data after edge emphasis do not exceed, for example, a range between the maximum and a minimum.

An advantage of the present invention is that edge emphasis can be performed for an image mixed with both a half-tone image and characters of low densities.

Another advantage of the present invention is that emphasis of noise components can be prevented in edge emphasis.

BRIEF DESCRIPTION OF THE DRAWINGS

These and other objects and features of the present invention will become clear from the following description taken in conjunction with the preferred embodiments thereof with reference to the accompanying drawings, and in which:

FIG. 3 is a diagram of a secondary differential filter used to obtain edge extraction data;

FIG. 4 is a diagram of a smoothing filter used to obtain edge extraction data;

DETAILED DESCRIPTION OF THE PREFERRED EMBODIMENTS

Figure 1:
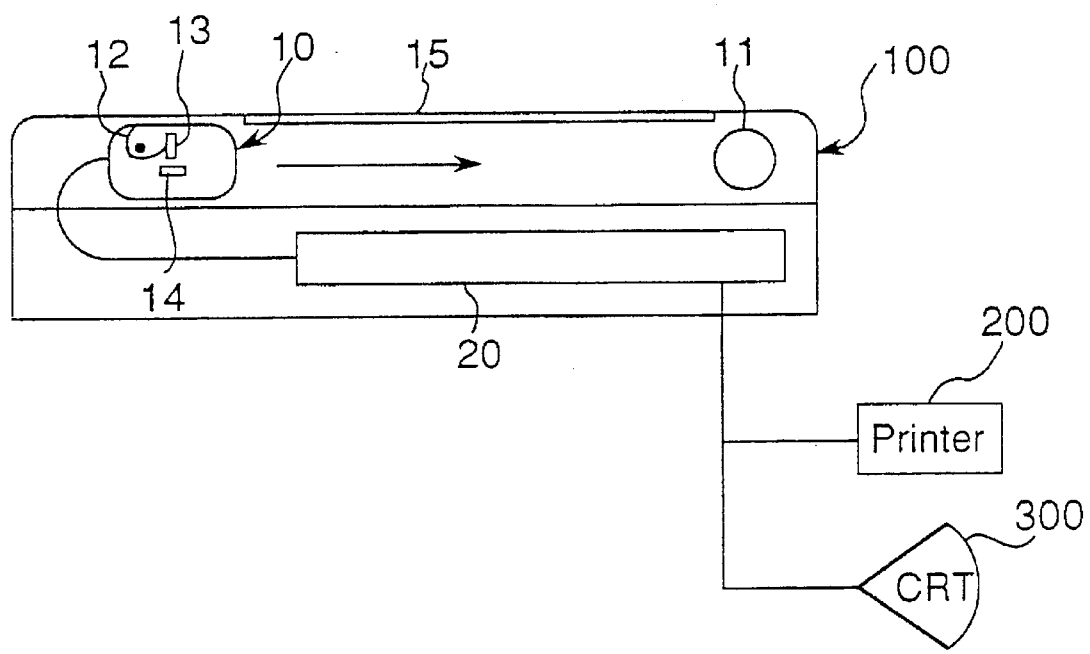
FIG. 1 is a block diagram of an image processor.

Referring now to the drawings, wherein like reference characters designate like or corresponding parts throughout the several views, FIG. 1 shows an entire structure of an image processor 100 of an embodiment of the invention. In an image reader 10, a scanner is driven by a motor 11 when a document put on a platen is read. When the document is read, it is exposed by an exposure lamp 12, and a light reflected from the document is condensed by a rod lens array 13 and converted by a color image sensor 14 of CCD to analog electrical signals.

An image processing section 20 processes the image data read by the image reader 10 for example for edge emphasis. Then, the data are provided to a printer 200 and a cathode ray tube (CRT) 300. The printer 200 reproduces the image data on a paper with a known electrophotographic process, while the CRT 300 displays an image subjected to edge emphasis.

Figure 2:
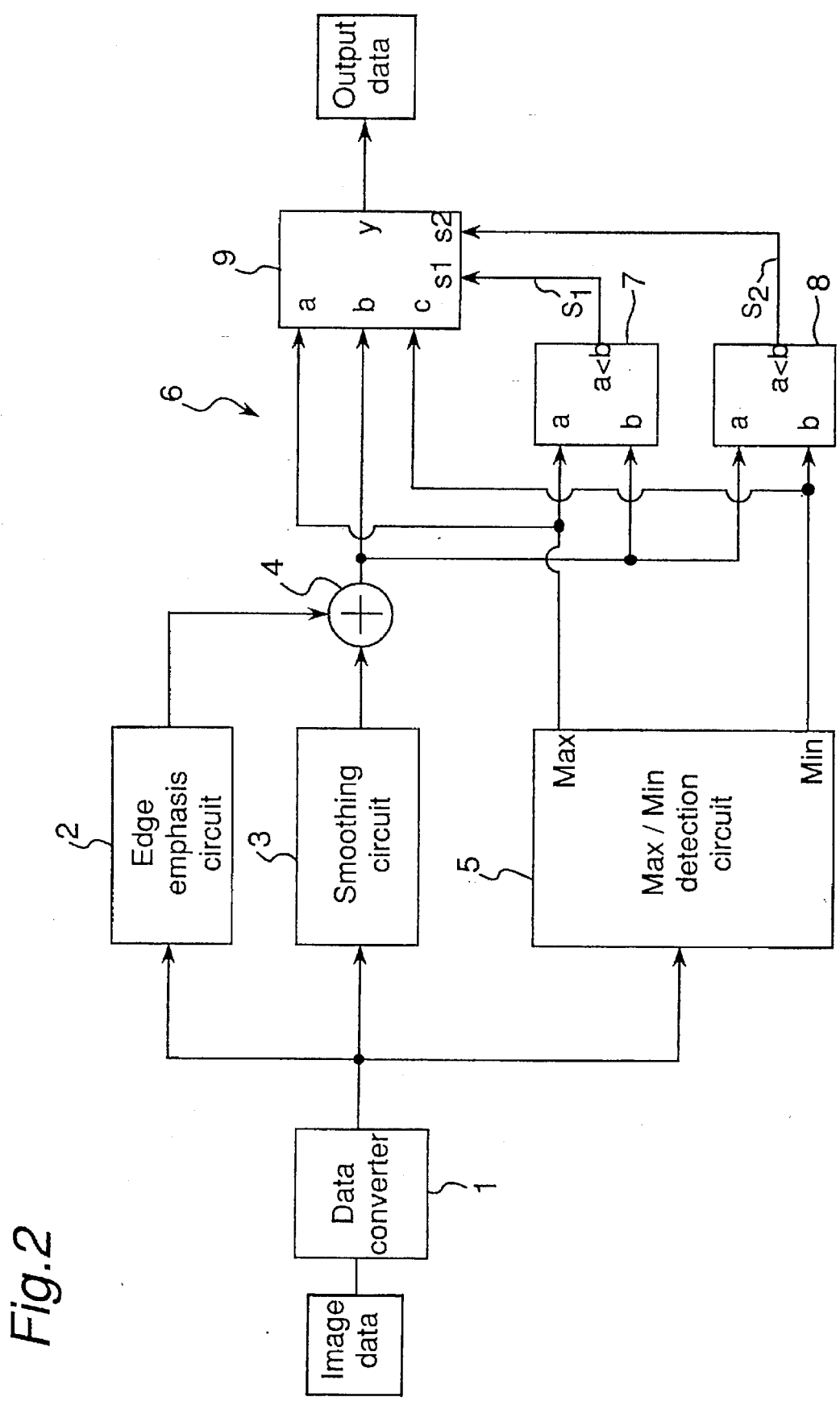
FIG. 2 is a block diagram of an image processing section.

FIG. 2 shows a structure of an image processing section 20. First, analog image data read by the image reader 10 is supplied to a data converter 1. In the data converter 1, the analog image data is converted by an analog-to-digital converter to a multi-level digital data, and the digital data is subjected to known shading correction. Then, because the digital image data is a data on reflection light, it is subjected to log conversion in order to supply a density data. Then, the density data is provided as image data in parallel to an edge emphasis circuit 2, a smoothing circuit 3 and a maximum/minimum detection circuit 4.

The edge emphasis circuit 2 performs edge emphasis on the image data with a 5*5 secondary differential filter shown in FIG. 3 or the like. The smoothing circuit 3 performs smoothing on the image data with a 5*5 smoothing filter shown in FIG. 4 to reduce noises. The output data of the edge emphasis circuit 2 and the smoothing circuit 3 are synthesized by an adder 4, and the synthesis data is called as MTF data. On the other hand, the maximum/minimum detection circuit 5 detects a maximum (Max) and a minimum (Min) in a processing block of 5*5 pixel matrix in the image data.

A data suppression section 6 comprises comparators 7, 8 and a selector 9. The maximum data are sent to the first comparator 7 and the selector 9 and the minimum data are sent to the second comparator 8 and the selector 9. After the maximum and minimum data are sent to the comparators 7, 8 and the selector 9, an MTF data is sent to them 7, 8 and 9 continuously. The first comparator 7 compares an MTF data with the Max data, and it provides a selection signal $S_1$="1" and "0" according as the MTF data is larger than the Max data or not. On the other hand, the second comparator 8 compares the MTF data with the Min data, and it provides a selection signal $S_2$="1" and "0" according as the MTF data is smaller than the Min data or not. The 3-input multiplexer 9 sends the MTF data, the Max data or the Min data according to selection signals $S_1$ and $S_2$. If $S_1$="0" and $S_2$="0" or Min<MTF<Max, the multiplexer 9 sends the MTF data. If $S_1$="1" and $S_2$="0" or Max<MTF, the multiplexer 9 sends the Max data. If $S_1$="0" and $S_2$="1" or MTF<Min, the multiplexer 9 sends the Min data. Thus, the MTF data are limited between the maximum and the minimum in a processing block.

In the present invention, even though edge emphasis is performed, image data levels which have not been in the image data before the edge emphasis by the edge emphasis circuit 2 are suppressed. In the present embodiment, image data in a processing block are processed not to exceed a range between the maximum and the minimum detected in the processing block. However, a different degree of data suppression may be adopted according to a kind of an image to be reproduced.

Figure 5A:
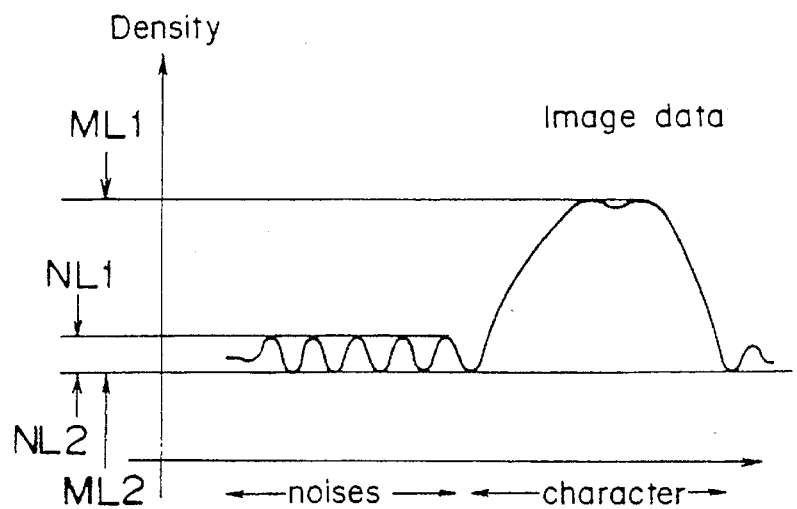
FIGS. 5A, 5B and 5C are graphs of image data, MTF data and output data, respectively.
Figure 5B:
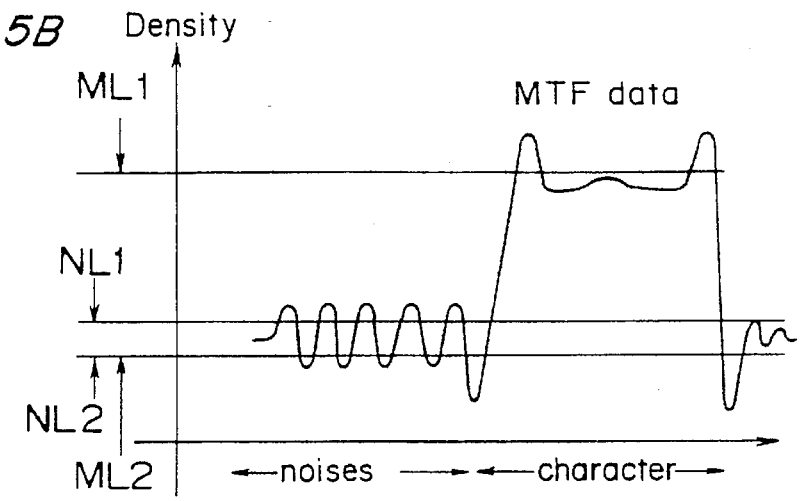
Figure 5C:
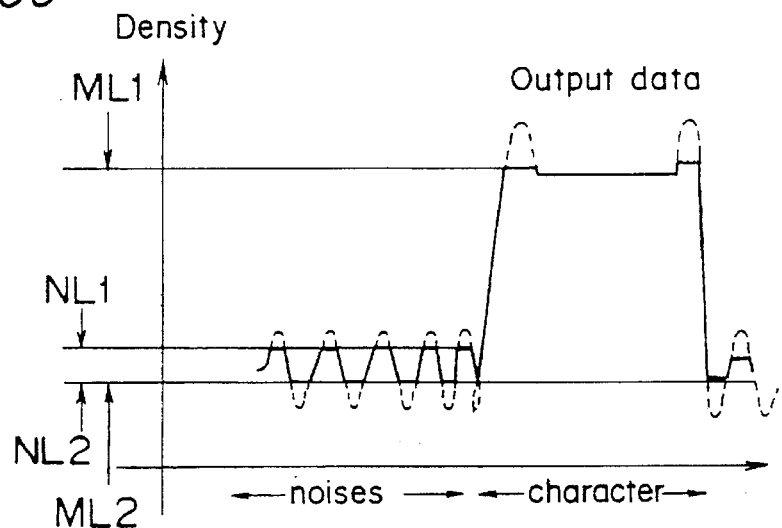

FIGS. 5A–5C show an example of the limit processing between the maximum and the minimum of the embodiment. FIG. 5A shows an example of input image data including noise data and character data received by the image processing section 20. It is assumed here that the noise data and the character data are processed in different processing blocks. A maximum and a minimum of the noise data are represented as NL1 and NL2, respectively. On the other hand, a maximum and a minimum of the character data are represented as ML1 and ML2, respectively. These values NL1, NL2, ML1 and ML2 are detected by the maximum/minimum detection circuit 5 in different processing blocks.

The input image data are subjected to edge emphasis and smoothing and an MTF data shown in FIG. 5B is generated. It is to be noted that the MTF data have sharper edges (or steeper slopes) of the character image while amplitude widths of the character data and the noises become larger.

As will be explained next, the larger density level widths are limited to those of the original image data to suppress increase in density level widths of the noises FIG. 5C shows output data of the noises and the character data limited by the comparators 7, 8 and the multiplexer 9. It is clear that noise data outside a range between the NL1 and NL2 are deleted, so that the level widths are the same as those of the original data. Though the character data outside a range between the ML1 and ML2 are also deleted, edges become sharper by the edge emphasis and a clear image can be reproduced.

Figure 6:
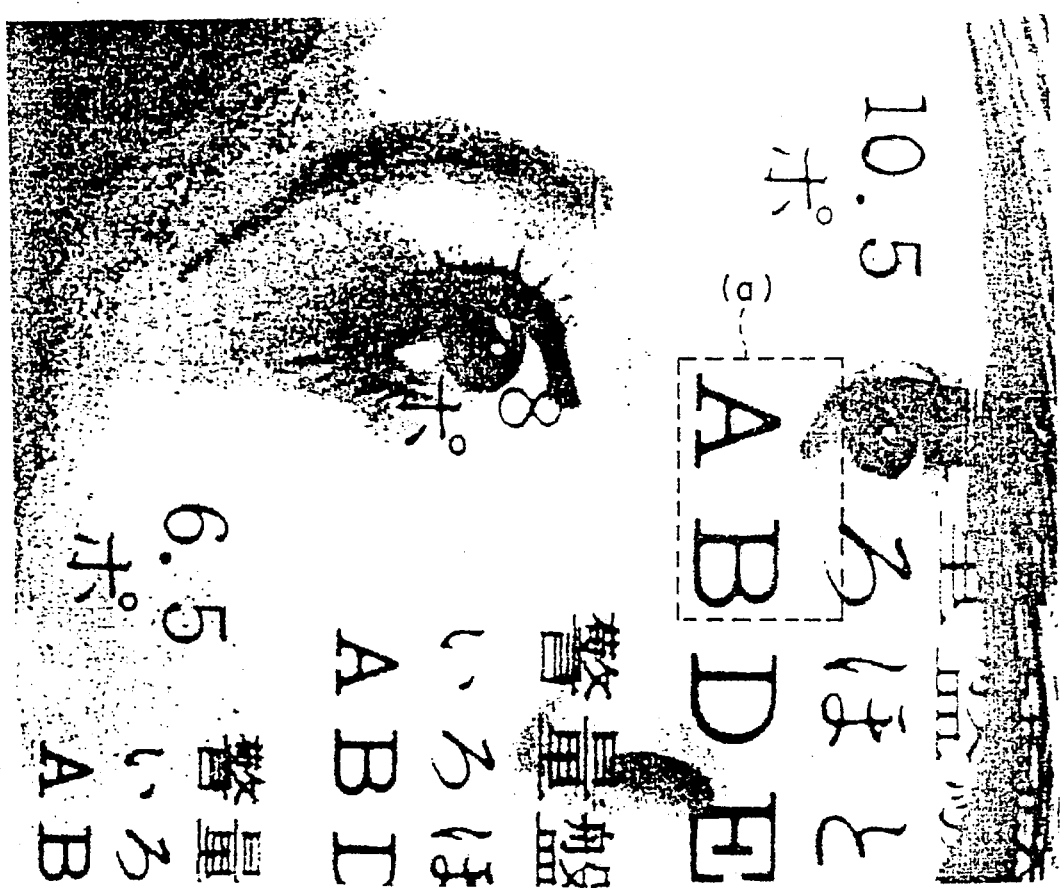
FIG. 6 is a hard copy of an original image.
Figure 7:
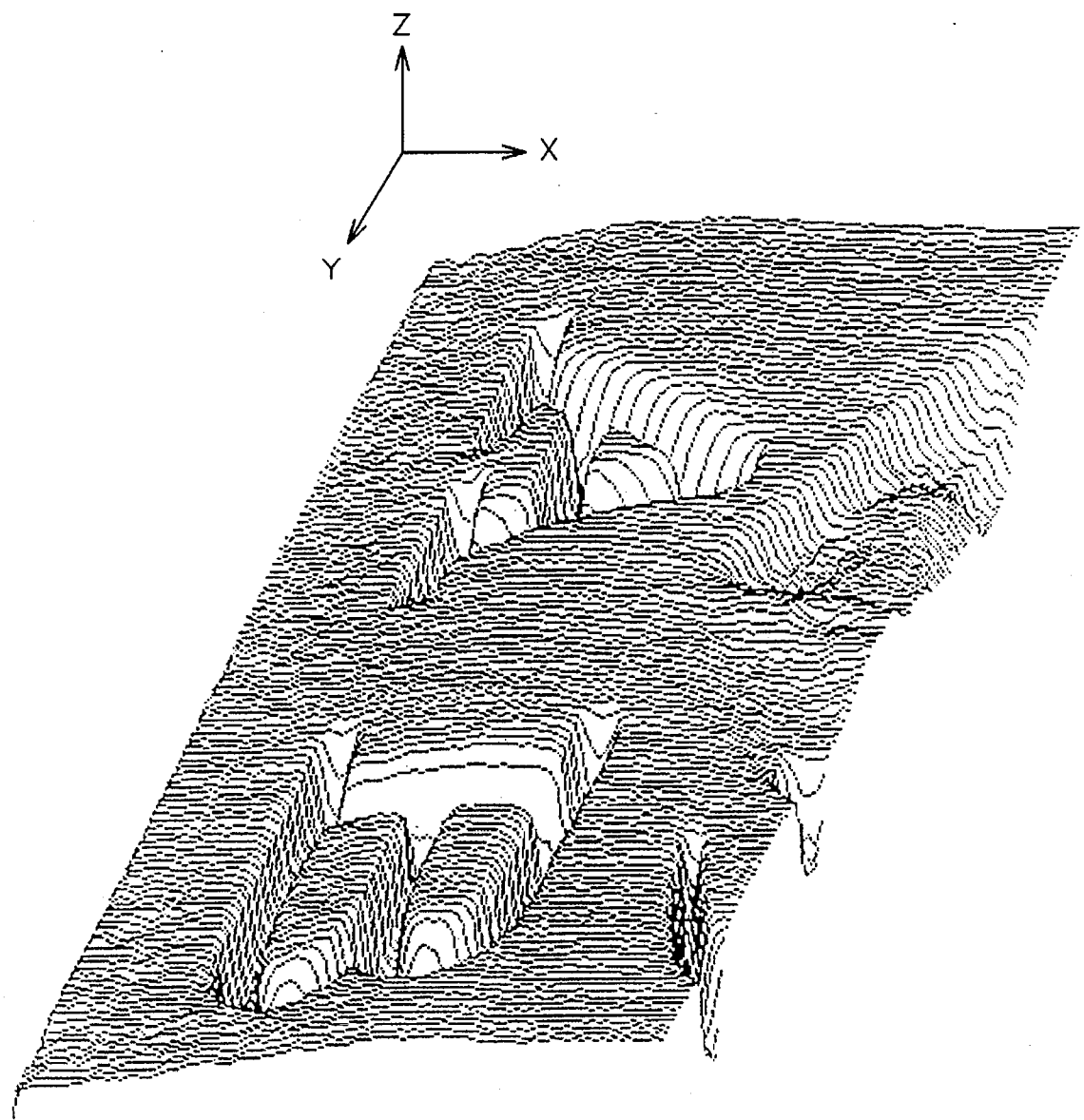
FIG. 7 is a diagram of three-dimensional analysis of density level of each pixel in a region (a) in FIG. 6 enclosed with a dashed line.

FIG. 6 shows an example of a hard copy of a photograph of an image displayed on the CRT 300. The image is based on the original image data read by the image reader 10, and edge portions in FIG. 6 are not sharp. FIG. 7 shows a three-dimensional analysis data of pixel density levels in an area denoted as "a" in FIG. 6 wherein the Z axis denotes density level, and lower level (refer to recess regions in FIG. 7) means darker pixel. As illustrated in FIG. 7, density level change at edge portions of characters "A" and "B" are gentle. That is, it is understood that characters "A" and "B" in the original image are vague.

Next, before explaining advantages of the present embodiment, two kinds of edge emphasis on the original image shown in FIG. 6 are displayed for comparison with the embodiment as first and second comparison examples. Finally, an edge emphasis image of the embodiment is displayed obtained by using edge emphasis of the image processing section, and it becomes clear that an edge emphasis image is improved.

Figure 8:
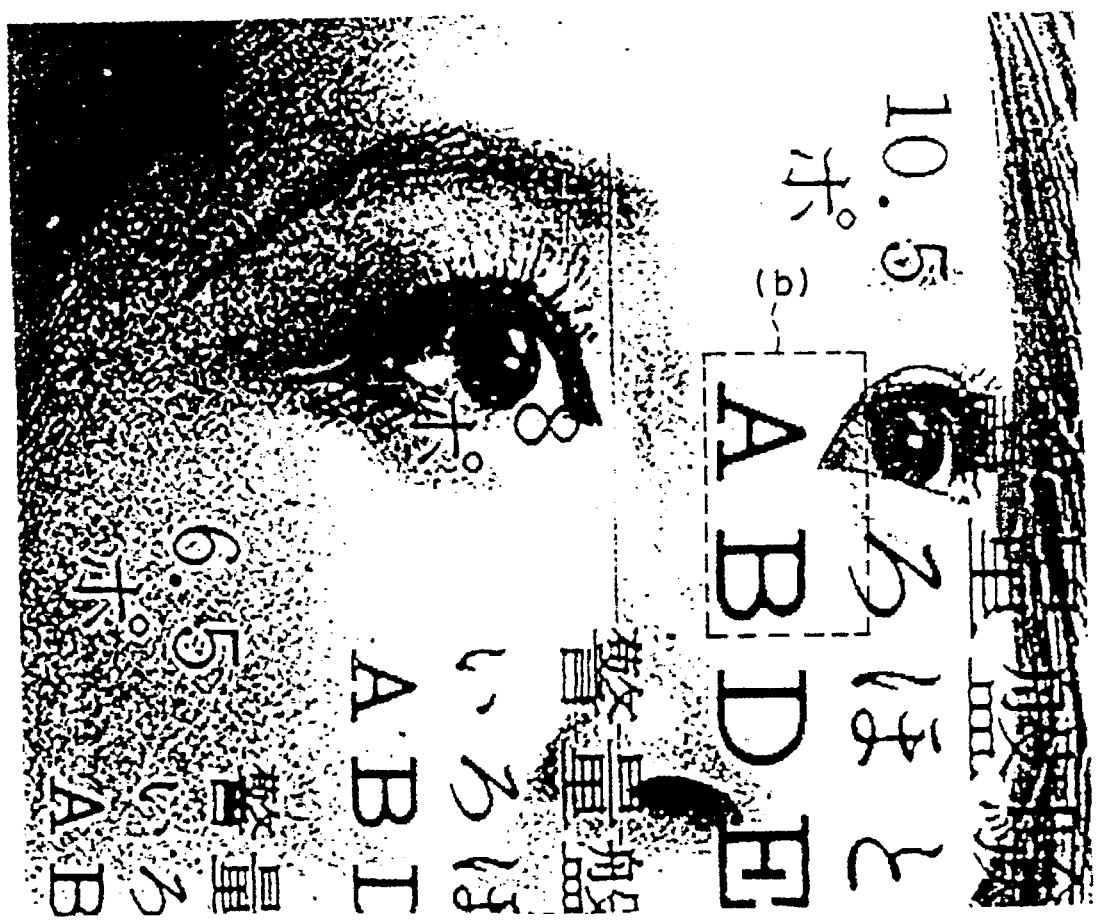
FIG. 8 is a diagram of a hard copy of a first comparison edge emphasis image of the original image shown in FIG. 6 subjected to edge emphasis with a simple Laplacian filter.
Figure 9:
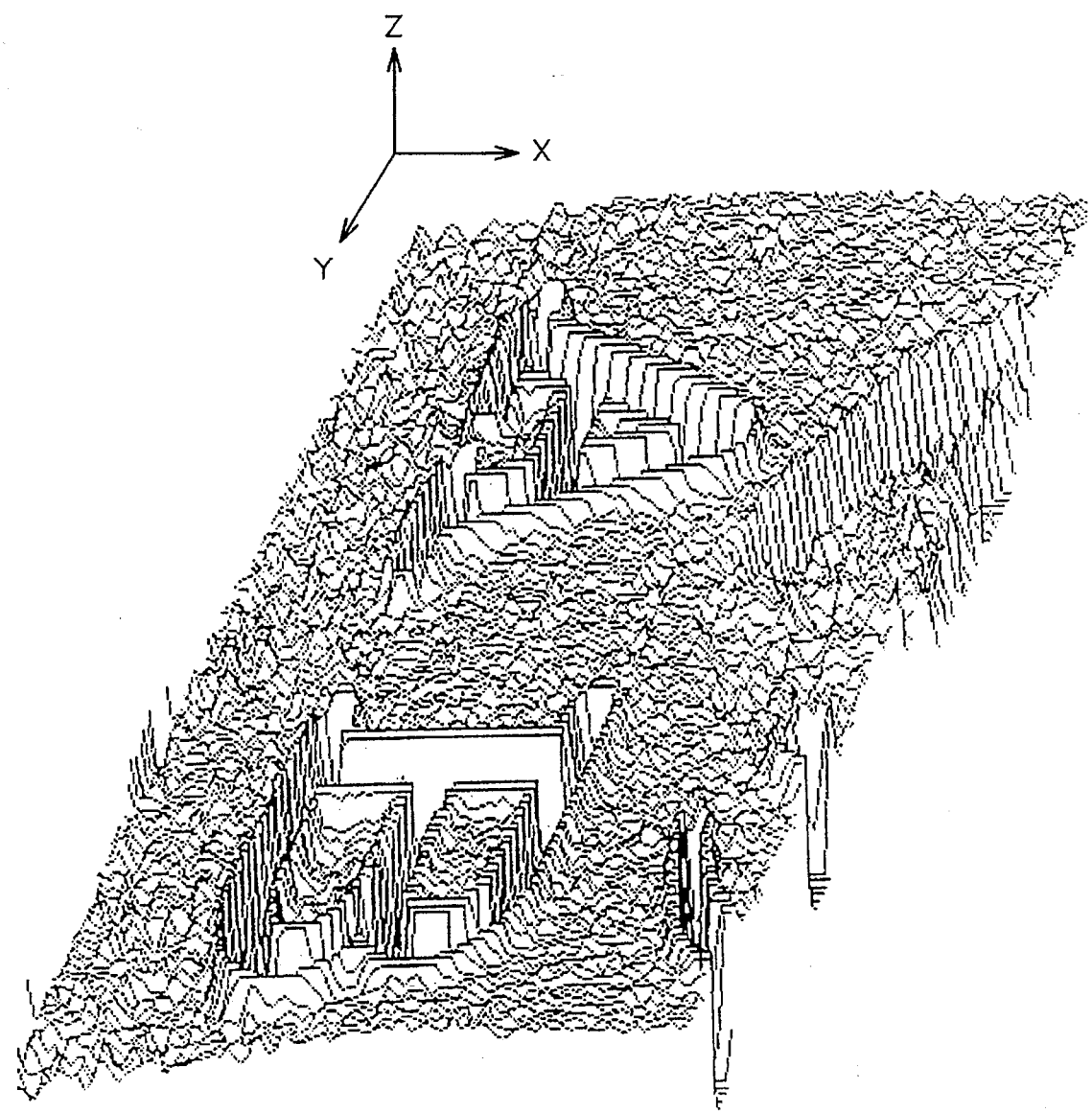
FIG. 9 is a diagram of three-dimensional analysis of density level of each pixel in a region (b) in FIG. 8 enclosed with a dashed line.

FIG. 8 shows a first comparison example of a hard copy of a photograph of a first comparison edge emphasis image displayed on the CRT 300. The image is obtained by using a simple Laplacian filter on the original image data read by the image reader 10. FIG. 9 shows a three-dimensional analysis data of pixel density levels in an area denoted as "b" in FIG. 8 wherein the Z axis denotes density level similarly to that in FIG. 7. As illustrated in FIG. 9, it is found that density level change at edge portions of characters "A" and "B" become sharper or the density change becomes steeper. At the same time, noises in the background become larger. Further, data around the edge portions of the characters "A" and "B" increase in the direction of white. This means that whitish portions appear around the characters.

Figure 10:
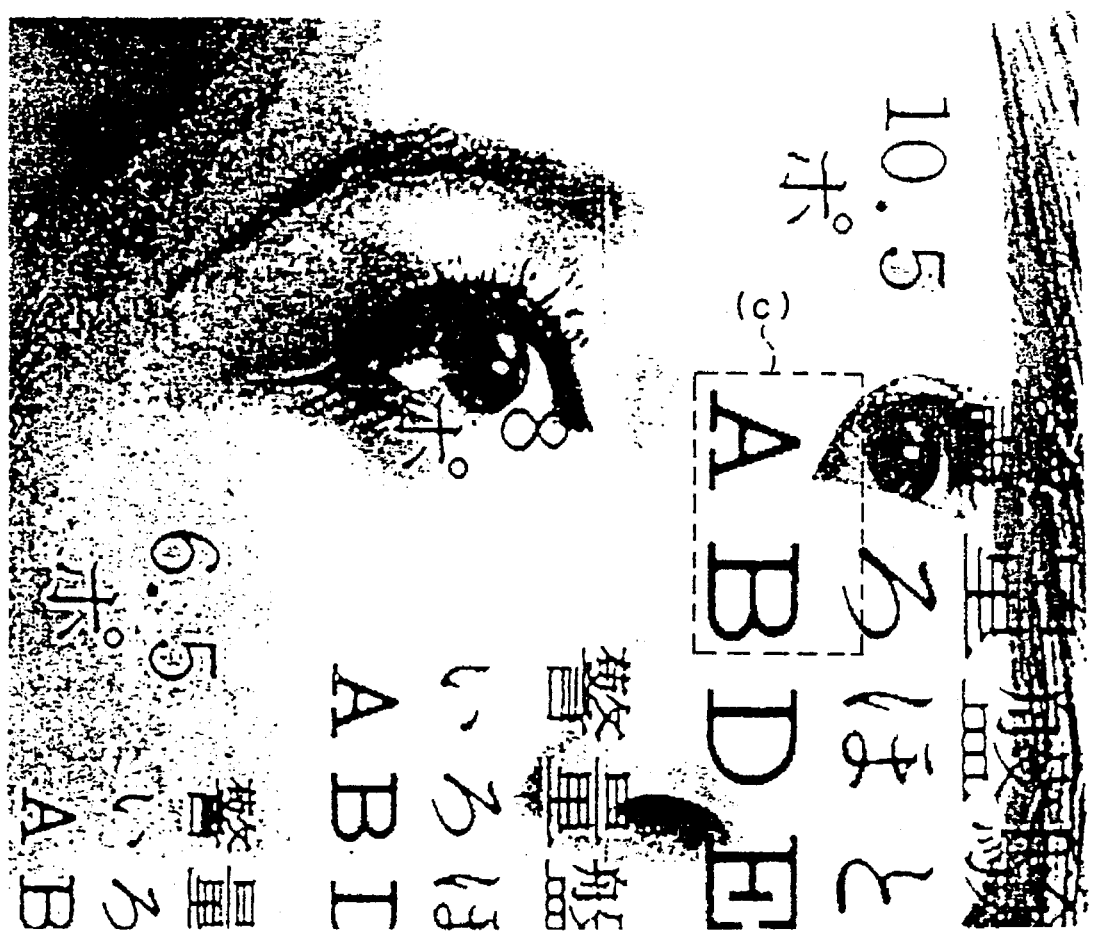
FIG. 10 is a diagram of a hard copy of a second comparison edge emphasis image of the original image shown in FIG. 6 subjected to edge detection first and to edge emphasis next.
Figure 11:
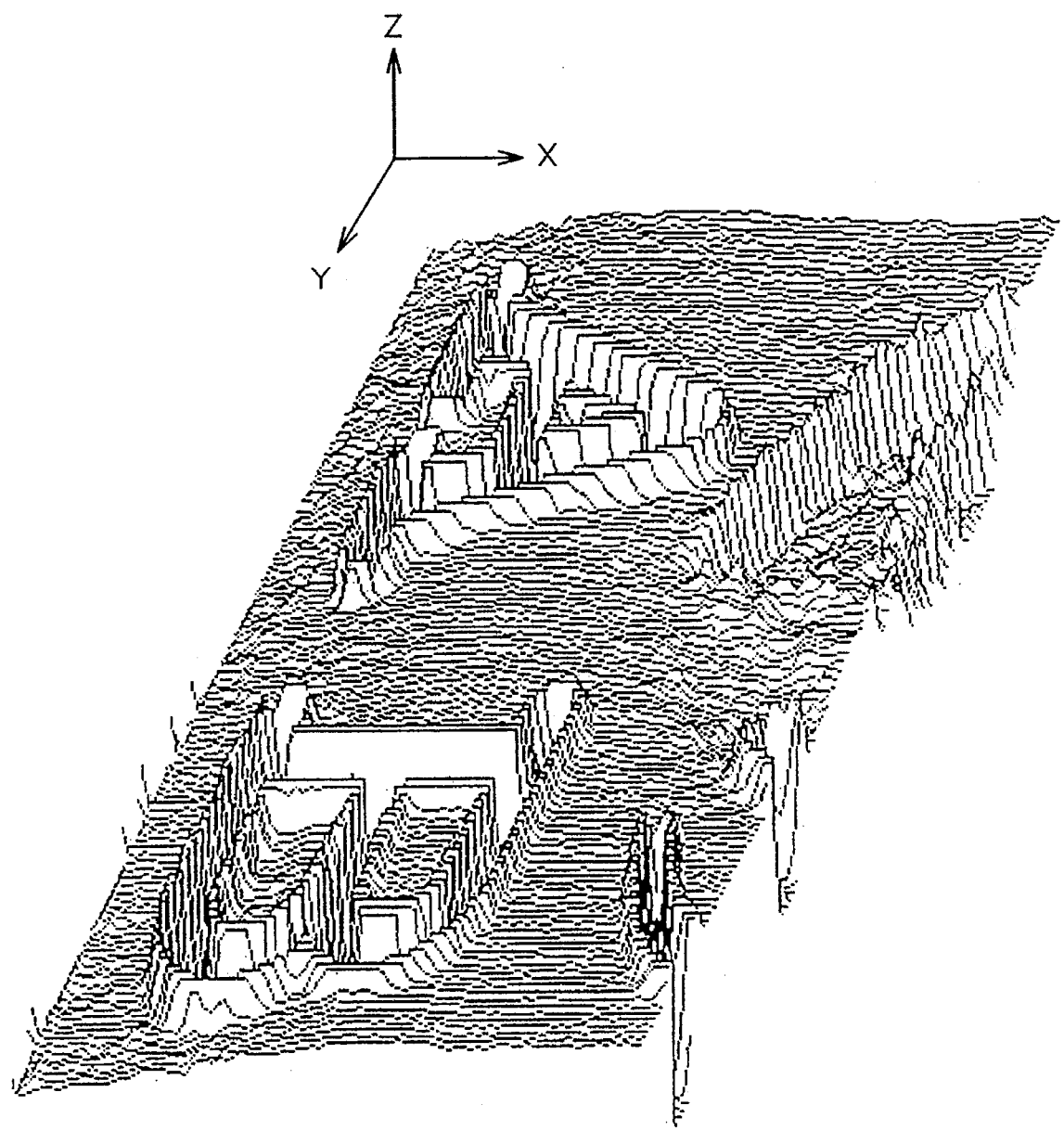
FIG. 11 is a diagram of three-dimensional analysis of density level of each pixel in a region (c) in FIG. 10 enclosed with a dashed line.

FIG. 10 shows a second comparison example of a hard copy of a photograph of a second comparison edge emphasis image displayed on the CRT 300. The image is obtained by detecting edge portions in an original image and by performing edge emphasis only on the detected edge portions. FIG. 11 shows a three-dimensional analysis data of pixel density levels in an area denoted as "c" in FIG. 10 wherein the Z axis denotes density level similarly to that in FIG. 7. As illustrated in FIG. 11, it is found that the second edge emphasis image has smaller noises in the background, but whitish portions still appear around the characters.

Figure 12:
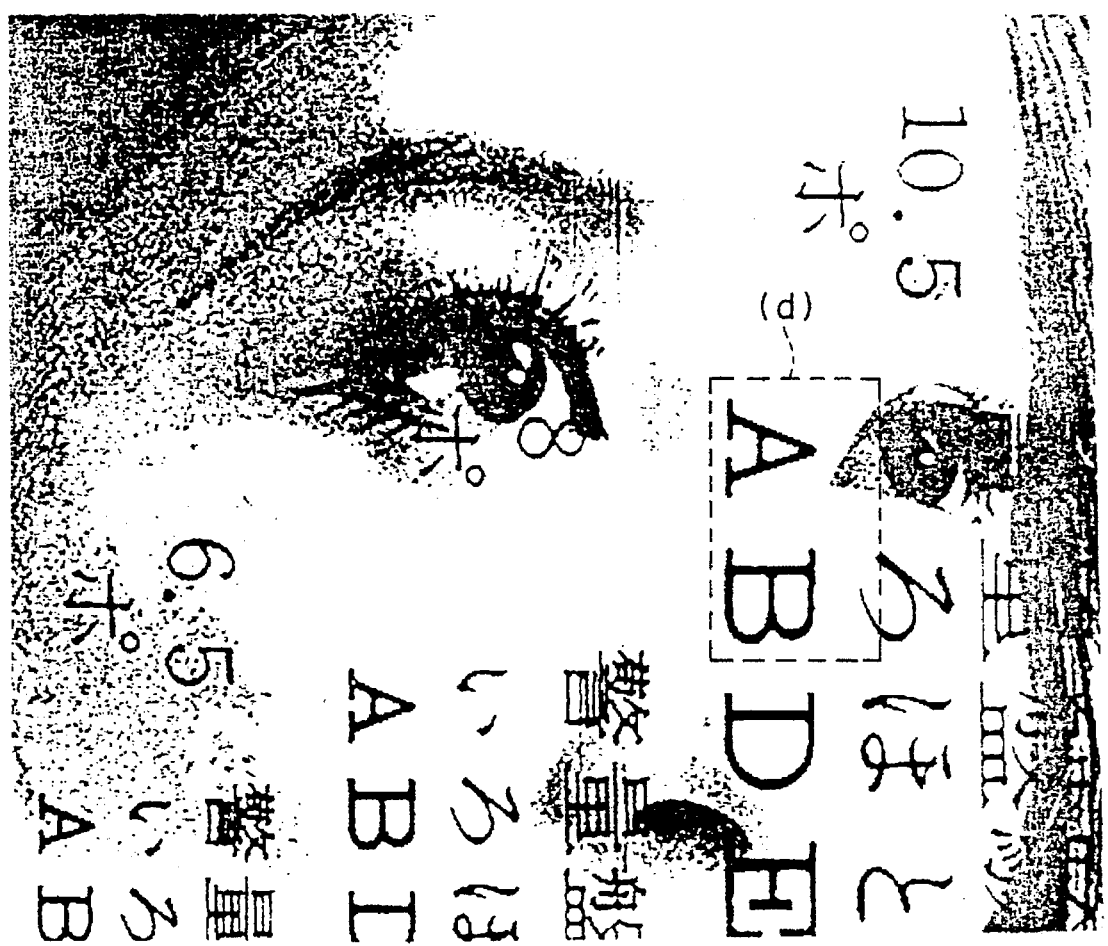
FIG. 12 is a diagram of a hard copy of an edge emphasis image of the original image shown in FIG. 6 subjected to edge emphasis by an image processor apparatus according to the present embodiment.
Figure 13:
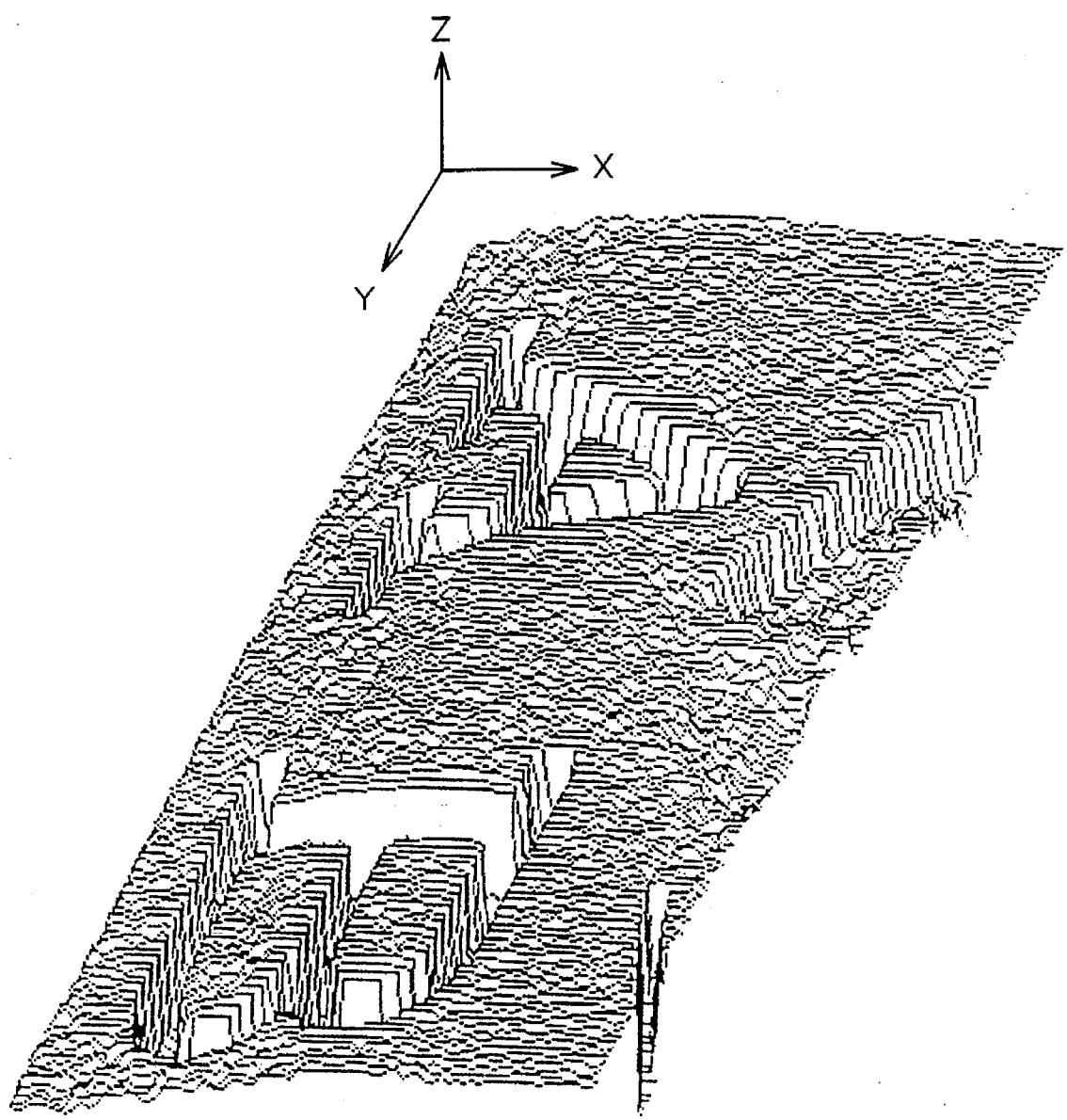
FIG. 13 is a diagram of three-dimensional analysis of density level of each pixel in a region (d) in FIG. 12 enclosed with a dashed line.

Finally, FIG. 12 shows an example of a hard copy of a photograph of an edge emphasis image displayed on the CRT 300 of the invention. The image is obtained by performing edge emphasis with the image processing section shown in FIG. 2. FIG. 13 shows a three-dimensional analysis data of pixel density levels in an area denoted as "d" in FIG. 12 wherein the Z axis denotes density level similarly to that in FIG. 7. As illustrated in FIG. 13, it is found that the edge emphasis image of the embodiment has no increase in noises in the background and no whitish portions around the characters.

In the image processing section shown in FIG. 2, the MTF level is limited at both maximum and minimum. However, the limitation only at the maximum or minimum is also useful. For example, the limitation only at the minimum is favorable for an image including hand-written characters of low densities.

Though a maximum and a minimum are detected in a processing block in the above-mentioned embodiment, they may be detected in a different size of pixel blocks, say in the entire picture. In the present invention, the data suppression section 6 corrects an MTF data by comparison with the maximum and minimum. However, a image data subjected to edge emphasis by the edge emphasis circuit 2 may be compared with the maximum and minimum instead of the MTF data for data suppression.

As explained above, in the image processing section of the embodiment, edges of characters such as hand-written characters of low densities or of narrow lines can be emphasized.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image processor comprising:
    an edge emphasis circuit which performs edge emphasis on image data in a pixel unit of a prescribed pixel matrix; and
    a suppression circuit which suppresses a width of an amplitude of the image data after the edge emphasis is performed by said edge emphasis circuit to become a width of the amplitude of the image data before the edge emphasis is performed by said edge emphasis circuit.

2. The image processor according to claim 1, wherein the image data include noise data, and said suppression circuit suppresses amplitude of levels of the noise data.

3. The image processor according to claim 1, wherein said edge emphasis circuit comprises a secondary differential filter.

4. The image processor according to claim 1 further comprising a smoothing circuit which performs smoothing in the prescribed pixel matrix; and an adder which adds an output data of said edge emphasis circuit and an output data of said smoothing circuit to provide a MTF data; wherein said suppression circuit suppresses MTF data levels which have not been in the image data prior to performing the edge emphasis by said edge emphasis circuit.

5. An image processor comprising:
    an edge emphasis circuit which performs edge emphasis on image data in the pixel unit of a prescribed pixel matrix;
    a detection circuit which detects a maximum of the image data; and
    a limit circuit which limits image data levels below the maximum detected by said detection circuit after the edge emphasis is performed by said edge emphasis circuit.

6. The image processor according to claim 5, wherein the image data include noise data.

7. The image processor according to claim 5, wherein said edge emphasis circuit comprises a secondary differential filter.

8. The image processor according to claim 5, wherein said detection circuit detects a minimum of the image data, and said limit circuit limits the image data levels over the minimum detected by said detection circuit after the edge emphasis is performed by said edge emphasis circuit.

9. The image processor according to claim 5 further comprising a smoothing circuit which performs smoothing in the prescribed pixel matrix; and an adder which adds an output data of said edge emphasis circuit and an output data of said smoothing circuit to provide a MTF data; wherein said suppression circuit suppresses MTF data levels which have not been in the image data prior to performing the edge emphasis by said edge emphasis circuit.

10. An image processor comprising:
    an edge emphasis circuit which performs edge emphasis on image data in a pixel unit of a prescribed pixel matrix;
    a detection circuit which detects a minimum of the image data; and
    a limit circuit which limits image data levels over the minimum detected by said detection circuit after performing edge emphasis on said image data.

11. The image processor according to claim 10, wherein the image data includes noise data.

12. The image processor according to claim 10, wherein said edge emphasis circuit comprises a secondary differential filter.

13. The image processor according to claim 10 further comprising a smoothing circuit which performs smoothing in the prescribed pixel matrix; and an adder which adds an output data of said edge emphasis circuit and an output data of said smoothing circuit to provide an MTF data, wherein said suppression circuit suppresses MTF data levels which have not been in the image data prior to performing the edge emphasis by said edge emphasis circuit.

14. An image processor comprising:
    an edge emphasis circuit which performs edge emphasis on image data in a pixel unit of a prescribed pixel matrix;
    a detection circuit which detects a maximum and a minimum of the image data; and
    a limit circuit which limits image data levels within a range between the maximum and the minimum detected by said detection circuit after edge emphasis is performed by said edge emphasis circuit.

15. An image processor comprising:
    an edge emphasis circuit which amplifies image data read by an image reader so as to emphasize an edge portion of the image data;
    a smoothing circuit which performs a smoothing process on the image data read by the image reader so as to reduce noise in the image data;
    a detection circuit which detects a maximum and a minimum of the image data read by the image reader;
    an adder which synthesizes an output data of said edge emphasis circuit and an output data of said smoothing circuit;
    a comparator which compares the synthesized data with the maximum image data or the minimum image data; and
    a selector which selects image data to be outputted among the synthesized data, the maximum image data and the minimum image data based on the result of the comparison of the comparator, so that image data to be outputted is limited within a range between the maximum image data and the minimum image data.

16. The image processor according to claim 15, wherein the image data includes noise data.

17. The image processor according to claim 15, wherein the maximum image data and the minimum image data are detected in a processing block of 5×5 pixel matrix in said image data.

18. The image processor according to claim 15, wherein said edge emphasis circuit comprises a secondary differential filter.

19. An image processor comprising:
    an edge emphasis circuit which amplifies image data read by an image reader so as to emphasize an edge portion of the image data;

a smoothing circuit which performs a smoothing process on the image data read by the image reader so as to reduce noise in the image data;

a detection circuit which detects a maximum and a minimum of a noise component in the image data read by the image reader;

an adder which synthesizes an output data of said edge emphasis circuit and an output data of said smoothing circuit;

a comparator which compares a value of a noise component of the synthesized data with the maximum image data or the minimum image data; and a selector which selects image data to be outputted based on the result of the comparison of the comparator, so that the noise component in the synthesized data is limited within a range between the maximum image data and the minimum image data.

* * * * *